(12) United States Patent
Jones et al.

(10) Patent No.: US 6,621,872 B1
(45) Date of Patent: Sep. 16, 2003

(54) SYSTEMS AND METHODS FOR IMPROVED MEDIUM ACCESS CONTROL MESSAGING

(75) Inventors: Vincent K. Jones, Redwood Shores, CA (US); Michael Pollack, Cupertino, CA (US); Gregory G. Raleigh, El Granada, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/282,516

(22) Filed: Mar. 31, 1999

(51) Int. Cl.[7] .......................... H04L 23/02; H04L 27/06
(52) U.S. Cl. .......................... 375/265; 375/341
(58) Field of Search ................. 375/265, 262, 375/341, 295, 316; 714/723, 784, 786, 794, 795

(56) References Cited

U.S. PATENT DOCUMENTS

| | | | |
|---|---|---|---|
| 5,197,061 A | 3/1993 | Halbert-Lassalle et al. ... 370/11 |
| 5,546,420 A | 8/1996 | Seshadri et al. ............ 375/200 |
| 5,751,739 A | 5/1998 | Seshadri et al. ............. 371/30 |
| 5,790,570 A | * 8/1998 | Heegard et al. ............ 375/262 |
| 6,266,350 B1 | * 7/2001 | Ojard et al. ................ 370/516 |
| 6,351,832 B1 | * 2/2002 | Wei .......................... 714/701 |

OTHER PUBLICATIONS

Jones et al., "Medium Access Control Protocol for OFDM Wireless Networks", Feb. 6, 1998, U.S. Patent Application No. 09/019,938.

* cited by examiner

Primary Examiner—Khai Tran
(74) Attorney, Agent, or Firm—Ritter, Lang & Kaplan LLP (57) ABSTRACT

Systems and methods for communicating medium access control (MAC) data without errors. Different encoding processes may be used to encode MAC data and data unrelated to MAC. The encoding processes used for MAC data employ more redundancy and are therefore capable of transmitting data without errors in more severe conditions than the encoding processes used for non-MAC data. Both MAC data and non-MAC data may be represented as a series of so-called symbols where each symbol is a complex value used to modulate a sinusoidal carrier signal. MAC data transmissions may employ a set of symbols having more widely spaced complex values than the symbol set used for non-MAC data transmissions. While the receiver is receiving MAC data, it may more easily distinguish which symbols have been sent, even when the symbols have been heavily corrupted with noise and interference. Thus network operation may be properly coordinated even in the presence of severe degradation of data transmission quality.

25 Claims, 6 Drawing Sheets

SYSTEMS AND METHODS FOR IMPROVED MEDIUM ACCESS CONTROL MESSAGING

BACKGROUND OF THE INVENTION

The present invention relates to digital communication systems and more particularly to systems and methods for communicating information about access to a shared medium.

In many communication systems, multiple users share access to a common transmission medium. Examples include a local area network (LAN) and wireless systems where multiple users transmit on the same frequency. In such shared access systems, there must be a protocol to regulate access so that users do not transmit simultaneously on the shared medium and interfere with one another. Such protocols are known as medium access contention (MAC) protocols.

MAC protocols often involve exchange of messages among transceivers accessing the medium. For example, a central access point may receive access request messages from subscriber units. The access point may respond by allocating time slots for transmission by the subscriber units and sending out a scheduling message incorporating allocation information. The subscriber units receive and process the scheduling message and schedule their transmissions so as not to interfere with one another. This is a representative time division multiple access (TDMA) system and is but one example of the use of MAC messages to coordinate access to a shared medium.

Consider now that data transmission between the access point and subscriber units may be subject to error due to noise and/or external interference. The communication system may employ encoding processes and/or a repeat request system to reduce or eliminate such errors but nonetheless some data will be received incorrectly and never corrected. The result may be corrupted or missing data at the receiver side. However, if a MAC message is received incorrectly, the consequences will be far more severe. For example, if even one of multiple subscriber units receives a scheduling message in error, it may lose the opportunity to transmit at all until the next scheduling message, or it may violate the established time slot allocation and interfere with other scheduled transmissions. If an access request message is received incorrectly at the access point, the scheduling message may inaccurately reflect the traffic demands of the subscriber unit transmitting the access request message. The result is that even a very small corruption of data in a MAC message may cause the corruption or loss of a large amount of non-MAC related data.

What is needed is a system for transmitting MAC data without corruption even in a severe environment.

SUMMARY OF THE INVENTION

Systems and methods for communicating medium access control (MAC) data without errors are provided by virtue of the present invention. Different encoding processes may be used to encode MAC data and data unrelated to MAC. The encoding processes used for MAC data employ more redundancy and are therefore capable of transmitting data without errors in more severe conditions than the encoding processes used for non-MAC data. Both MAC data and non-MAC data may be represented as a series of so-called symbols where each symbol is a complex value used to modulate a sinusoidal carrier signal. MAC data transmissions may employ a set of symbols having more widely spaced complex values than the symbol set used for non-MAC data transmissions. While the receiver is receiving MAC data, it may more easily distinguish which symbols have been sent, even when the symbols have been heavily corrupted with noise and interference. Thus network operation may be properly coordinated even in the presence of severe degradation of data transmission quality. One application is fading wireless channels where there are periods of severe degradation as channel characteristics vary.

According to a first aspect of the present invention, in a digital communication system employing a transmission medium shared among multiple users, a transmitter system includes: a first encoder that encodes data related to coordinating access to the transmission medium according to a first encoding scheme, a second encoder that encodes data not related to coordinating access to the transmission medium according to a second encoding scheme, and a control system that allocates transmission time between output of the first encoder and the second encoder. The first encoding scheme introduces more redundancy than the second encoding scheme.

According to a second aspect of the present invention, in a digital communication system employing a transmission medium shared among multiple users, a transmitter system includes: a first mapper that outputs complex symbol values falling on a first symbol constellation responsive to data relating to coordinating access to the transmission medium, a second mapper that outputs complex symbol values falling on a second symbol constellation responsive to data not relating to coordinating access to the transmission medium, and a control system that allocates transmission time between output of the first mapper and output of the second mapper. Complex symbol values of the first symbol constellation are spaced more widely than complex symbol values of the second symbol constellation.

A further understanding of the nature and advantages of the inventions herein may be realized by reference to the remaining portions of the specification and the attached drawings.

DESCRIPTION OF SPECIFIC EMBODIMENTS

Figure 1:
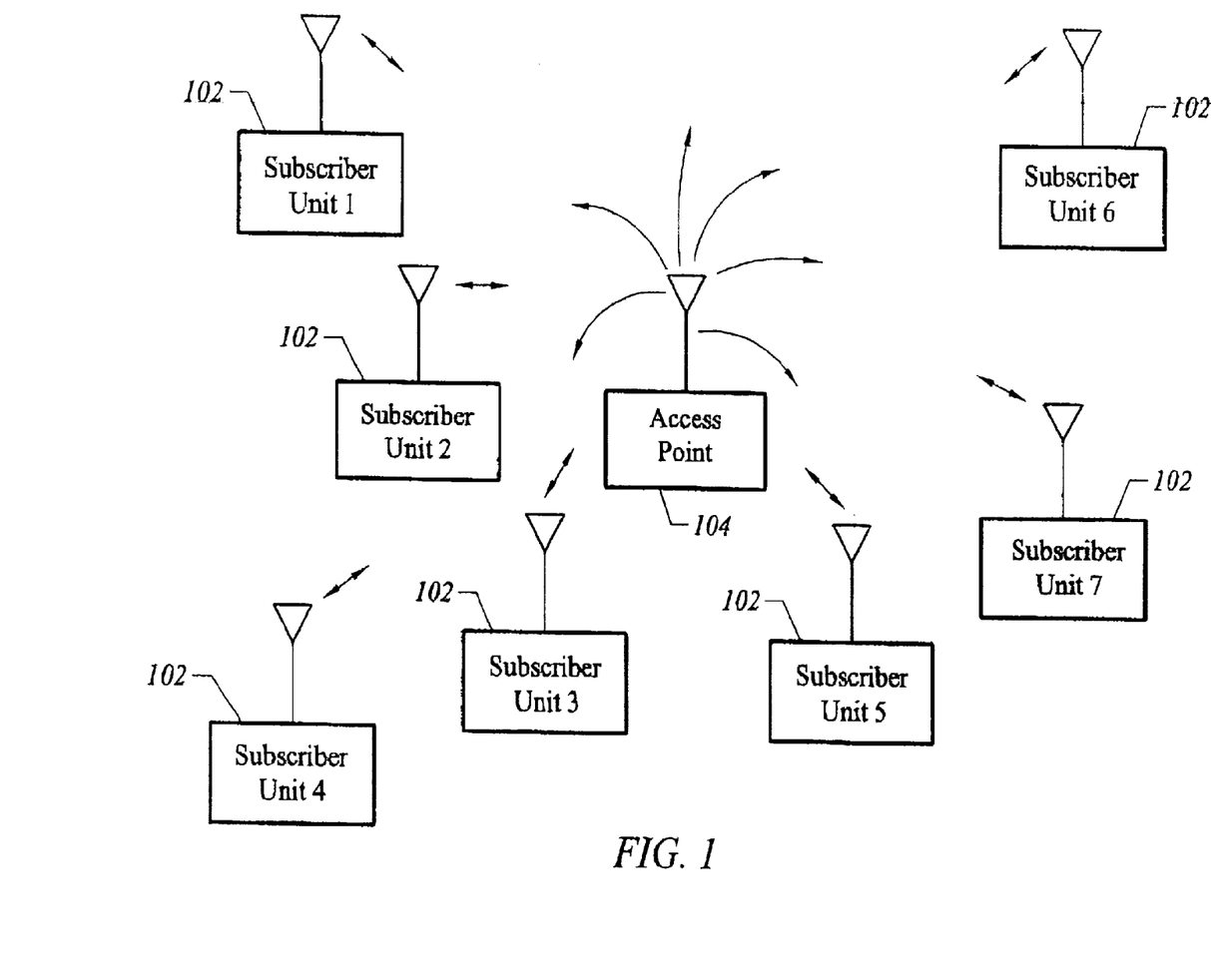
FIG. 1 depicts a representative multi-user communications system.

FIG. 1 depicts a representative multi-user communications system 100. Individual subscriber units 102 communicate with a central access point 104. Spectrum for communication may be shared among the subscriber units 102 and central access point 104. For example, subscriber units 102 and central access point 104 may all use a common frequency for transmission with only one transmitter being operational during any given time interval. Multiple frequencies may also be shared among many users.

Alternatively, subscriber units 102 may share a common frequency for transmission up to central access point 104 while central access point 104 uses a different frequency for transmission down to subscriber units 102.

Optimal usage of the available spectrum typically requires coordination of transmission so that available time slots for transmission are used and so that transmitters do not interfere with one another by transmitting at the same time. A MAC (medium access contention) protocol provides this coordination. Some MAC protocols do not provide for central coordination but rather anticipate that collisions (incidents of simultaneous interfering transmission) will occur and provide mechanisms to handle them. Other MAC protocols involve requests for access to central access point 104 and distribution of control information.

Figure 2:
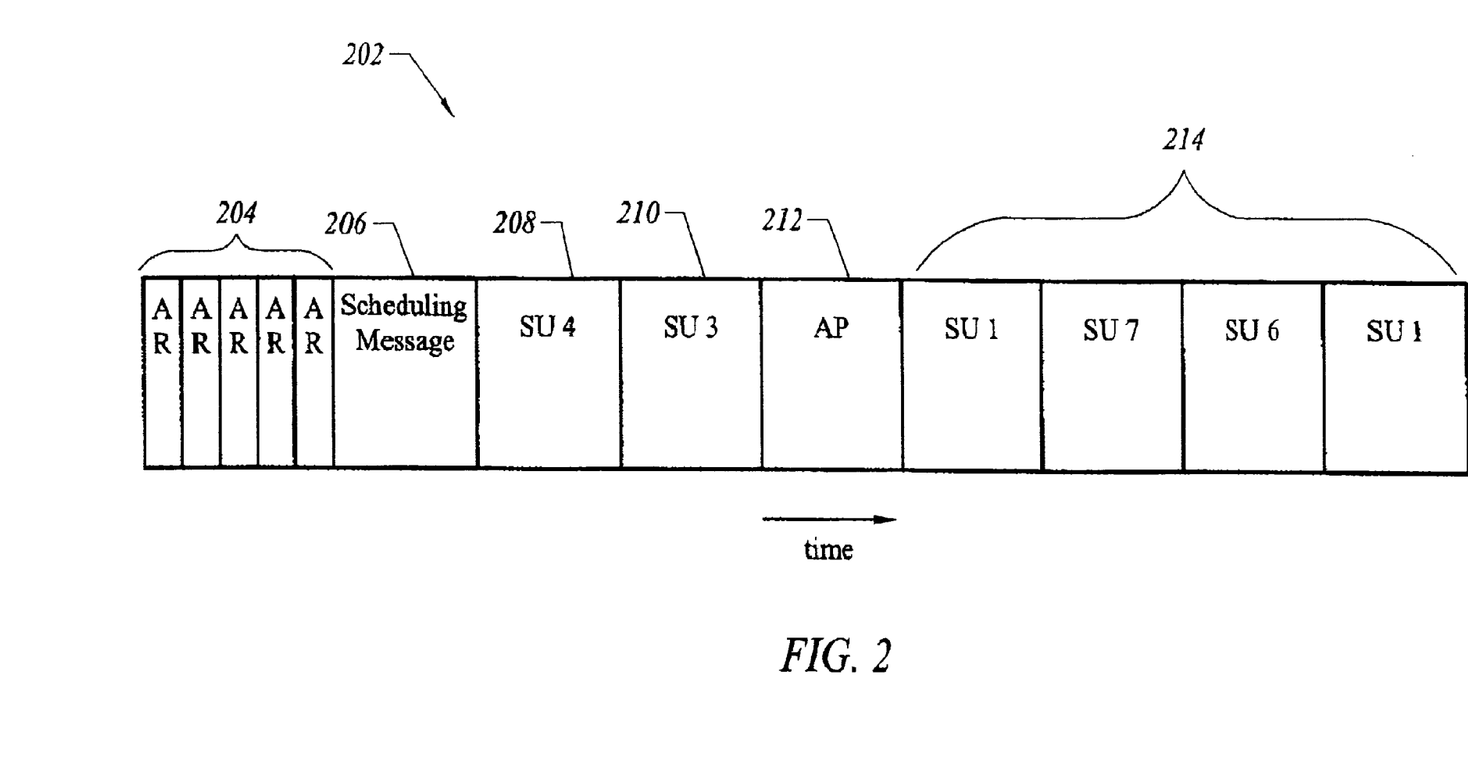
FIG. 2 depicts operation of a MAC protocol.

FIG. 2 depicts operation of a representative MAC protocol where central access point 104 and subscriber units 102 and where only one transmitter transmits during any time interval. A diagram 202 shows the allocation of time slots. A first group of time slots 204 labeled "AR" are dedicated to subscriber unit access requests. Each time slot "AR" represents an individual one of subscriber units 102 sending a request to central access point 104. The MAC protocol reserves this block of time for access requests. However, which subscriber units will request access in one of the AR slots cannot be mandated in advance so there may be collisions here. A next time slot 206 is reserved for a scheduling message transmitted by central access point 104. The scheduling message tells the individual subscriber units 102 that have request access when they may transmit. Further time slots operate according to this schedule. A time slot 208 includes a transmission by a subscriber unit 4. A time slot 210 includes a transmission by a subscriber unit 3. A next time slot 212 is reserved for transmission by central access point 104. Then, there are further time slots 214 reserved for transmission by subscriber units 1, 7, 6, and 1 in that order. A subscriber unit data transmission may also include a further request for access to central access point 104.

The access requests and scheduling message are examples of MAC protocol messages. MAC protocol messages represent vulnerabilities for a communication system because noise and/or interference that corrupts a MAC protocol message to the point that it cannot be correctly received will also disrupt communication coordinated by that MAC protocol message. For example, if an access request is not received correctly at central access point 104, a subscriber unit will not get the opportunity to transmit data to be transmitted. This may cause either lost data or an unacceptable increase in latency for latency-sensitive traffic such as voice. If a scheduling message is received incorrectly, an individual subscriber unit may not realize that it has been allocated a transmission opportunity, again causing either lost data or excessive latency. Another possible effect is that the subscriber unit may erroneously believe that it has been allocated a particular time slot for transmission that was actually allocated to another subscriber unit. A protocol violating collision may then occur when both subscriber units attempt to transmit at the same time.

According to the present invention, MAC protocol messages may be protected through the use of coding and/or modulation techniques that are more resistant to channel impairments. These techniques may trade away data transmission efficiency for resistance to noise and/or interference for the MAC data. The modulation and/or coding techniques used for non-MAC related transmissions will achieve higher data transmission efficiency at the cost of greater sensitivity to channel impairments.

Figure 3:
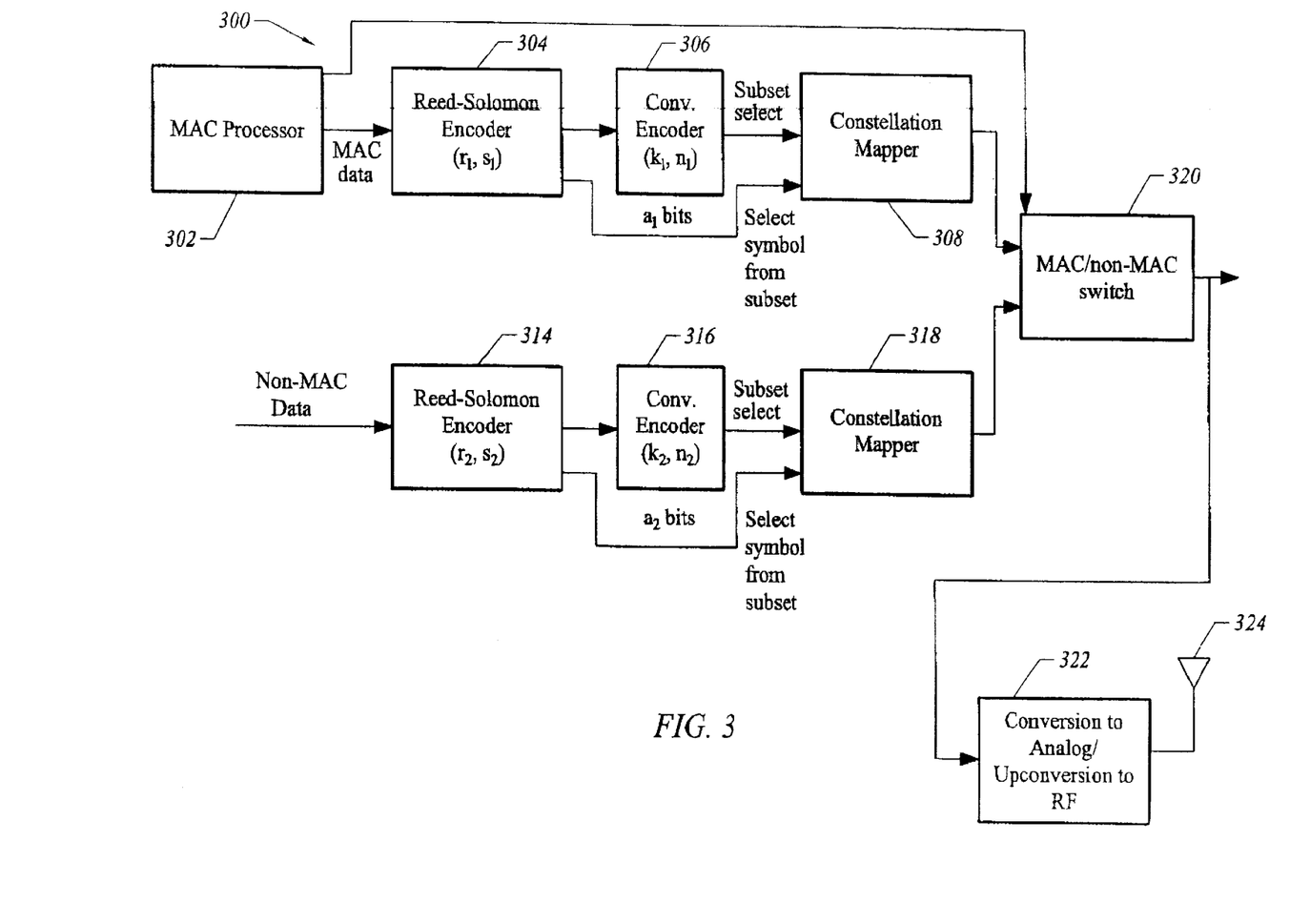
FIG. 3 depicts a transmitter system according to one embodiment of the present invention.

FIG. 3 depicts a transmitter system 300 according to one embodiment of the present invention where channel coding techniques are varied according to whether data to be transmitted is MAC data or non-MAC data. In general, channel coding techniques introduce redundancy into data transmission to increase resistance to channel impairments. According to the present invention, the amount of redundancy introduced is elevated for MAC transmissions.

A MAC processor 302 originates MAC data. If transmitter system 300 is a part of central access point 104, the MAC data may include scheduling messages. If transmitter system 300 is incorporated within one of subscriber units 102, the MAC data may include access requests. The MAC data is input to, e.g., a Reed-Solomon encoder 304. Reed-Solomon encoder 304 is a type of block coder and outputs $s_1$ bits of data for every input $r_1$ bits of input data. Since $s_1$ is greater than $r_1$, Reed-Solomon encoder 304 introduces redundancy. A convolutional encoder 306 introduces further redundancy. For each $k_1$ input bits, convolutional encoder 306 outputs $n_1$ bits. A constellation mapper 308 assigns complex values to groups of input bits. The output of constellation mapper 308 is a series of such complex values, referred to as symbols. Each symbol represents a magnitude and phase of a carrier signal to be transmitted over the air.

To implement trellis coded modulation, not all the bits output by Reed-Solomon encoder 304 are input to convolutional coder 306. The symbol alphabet from which constellation mapper 308 selects symbols for transmission is divided into subsets. The bits output by convolutional encoder are used to select a particular subset of the alphabet. The $a_1$ bits that are output by Reed-Solomon encoder 304 but bypass convolutional encoder 306 are used to select a particular symbol from the selected subset.

Non-MAC data may also be subject to an encoding process that in the represented embodiment incorporates both Reed-Solomon coding and trellis coding techniques. A Reed-Solomon encoder 314 outputs $S_2$ bits for every $r_2$ input bits. Since Reed-Solomon encoder 314 introduces less redundancy than Reed-Solomon encoder 304, the ratio $s_2/r_2$ is more than the ratio $s_1/r_1$. A convolutional encoder 316 and a constellation mapper 318 operate to implement trellis coded modulation for the non-MAC data. Again, the trellis coded modulation for the non-MAC data introduces less redundancy than the trellis coded modulation for the MAC data so the rate $n_2/k_2$ is more than the rate $n_1/k_1$. By using convolutional coder output bits to directly select symbols without any subset selection, a convolutional encoding scheme may be implemented as opposed to trellis coded modulation. Again because of the differing encoder rates, more redundancy is added to the non-MAC data than to the MAC data. In an alternative embodiment, encoding steps that operate on the MAC data may be omitted entirely from the processing of non-MAC data.

A MAC/non-MAC switch 320 selects between MAC data and non-MAC data under the control of MAC processor 302. The switch state depends on whether the current time interval is allocated to transmission of MAC data. A conversion system 322 then converts the selected complex symbol values to analog form and modulates a radio frequency (RF) carrier wave for transmission via an antenna 324.

FIG. 3 is merely representative of encoding processes that may be varied to protect MAC messages. A useful general discussion of error control in communication systems may be found in Wicker, *Error Control Systems for Digital Communication and Storage,* (Prentice Hall, 1995), the contents of which are herein incorporated by reference.

The present invention may also operate in conjuction with OFDM systems where the available transmission spectrum is divided into frequency domain subchannels and the complex values output by the constellation mappers 308 and 310 represent symbols transmitted within individual frequency domain subchannels. An IFFT process is then applied to groups of symbols output by the constellation mappers to produce successive bursts of time domain symbols. To assure orthogonality of individual frequency domain subchannels in the face of dispersive channel effects, a cyclic prefix may be affixed to the individual time domain bursts.

It is also possible for individual subscriber units employing OFDM to transmit simultaneously by using different frequency domain subchannels. A technique for having multiple subscriber units simultaneously transmit access requests by using different frequency domain subchannels is disclosed in the application entitled MEDIUM ACCESS CONTROL FOR OFDM WIRELESS NETWORKS, U.S. application Ser. No. 09/019,938, the contents of which are herein incorporated by reference. Enhanced signal processing techniques may still be used for access requests in such an OFDM system according to the present invention.

Figure 4:
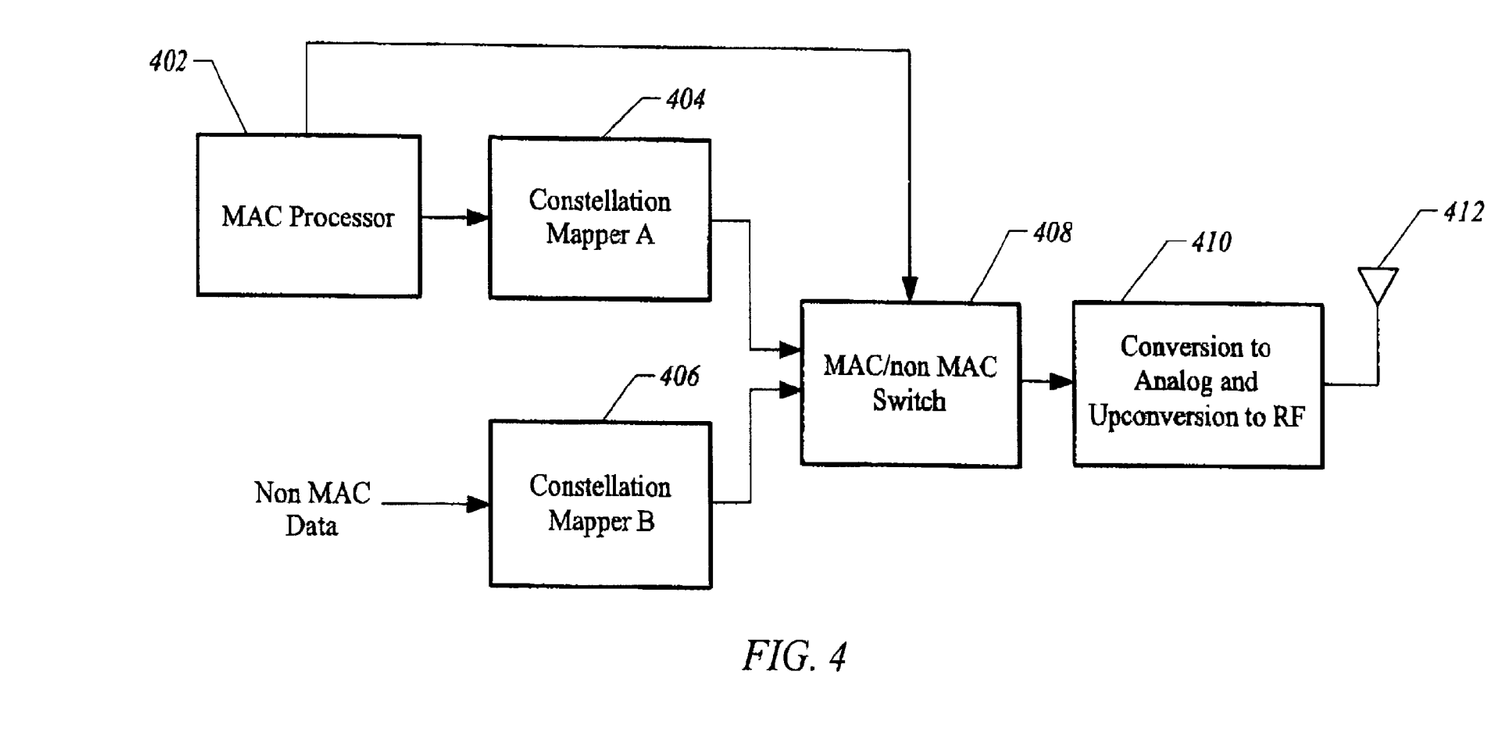
FIG. 4 depicts a transmitter system according to an alternative embodiment of the present invention.

FIG. 4 depicts a transmitter system 400 according to an alternative embodiment of the present invention. In transmitter system 400, there is no encoding or the same encoding processes are applied to both MAC data and non-MAC data so there is no need to depict the encoding processes. Instead, MAC data and non-MAC data use a different symbol alphabet for transmission. The symbol alphabet used for MAC data uses more widely spaced complex values than the symbol alphabet used for non-MAC data. This provides the MAC data greater robustness against noise and interference at the expense of data carrying capacity.

Figure 5A:
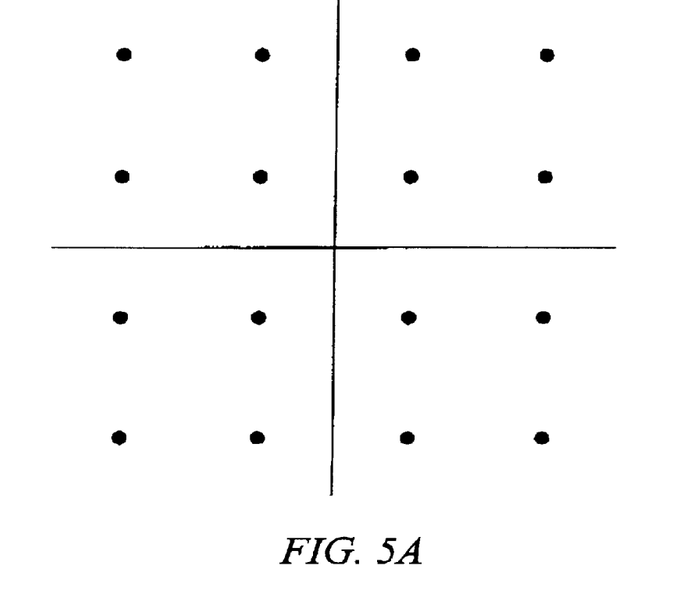
FIGS. 5A–5B depict a symbol constellation employed for non-MAC data transmission and a symbol constellation employed for MAC data transmission according to one embodiment of the present invention.

A MAC processor 402 originates MAC data. A constellation mapper 404 assigns groups of bits to symbols selected from a symbol alphabet. A representative symbol alphabet is shown in FIG. 5A. FIG. 5A depicts a complex plane. Each symbol is represented as a dot at a position on the plane corresponding to its complex value. There are 16 symbols in the depicted symbol alphabet so that each time a symbol is selected for transmission, 4 bits of data are communicated.

Figure 5B:
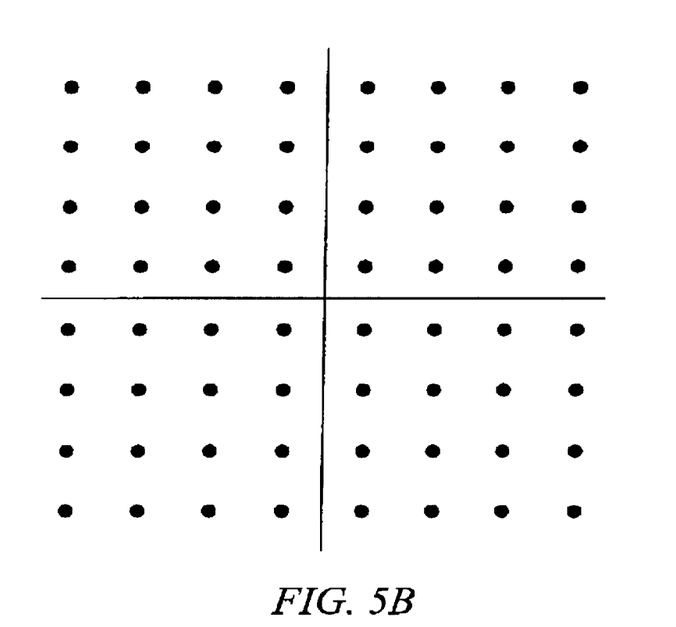

A constellation mapper 406 assigns groups of bits of non-MAC data to symbols selected from an alternative symbol alphabet depicted in FIG. 5B. In the symbol alphabet depicted in FIG. 5B, there are 64 symbols so that each time a symbol is selected for transmission, 6 bits of data are communicated. It can be seen that the symbols in the alphabet of FIG. 5B are more closely spaced than the symbols in the alphabet of FIG. 5A. Thus, once noise and interference are superimposed on the symbols are FIG. 5B, it becomes more difficult for a receiver to distinguish symbols from one another and determine which symbol was in fact transmitted during any given time interval. The advantage of the symbol alphabet of FIG. 5B is that each symbol carries more information than in FIG. 5A, 6 bits as opposed to 4 bits.

A switch 408 switches between MAC data and non-MAC data under the control of MAC processor 402. A conversion system 410 then converts the selected complex symbol values to analog form and modulates a radio frequency (RF) carrier wave for transmission via an antenna 412.

It should be noted that the MAC data protection techniques of FIG. 3 and FIG. 4 may be combined in one system. Transmission of MAC data would then employ both higher redundancy channel coding and a more widely spaced symbol alphabet.

Figure 6:
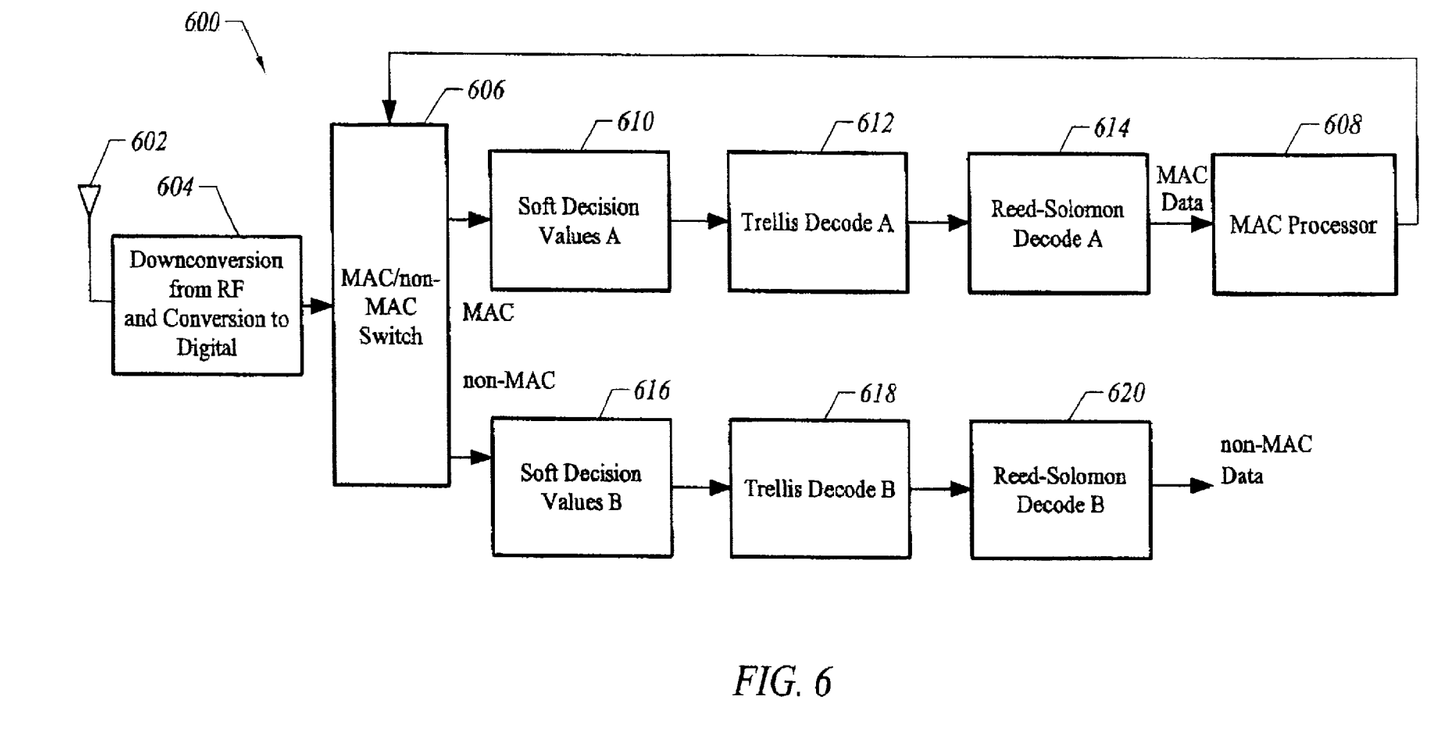
FIG. 6 depicts a receiver system according to one embodiment of the present invention.

FIG. 6 depicts a receiver system 600 according to one embodiment of the present invention. A carrier wave is received via an antenna 602. A downconversion system 604 recovers a modulation waveform from the carrier wave and converts the modulation waveform to a discrete time series of complex symbols. A MAC/non-MAC switch 606 directs the received symbols according to whether MAC data or non-MAC data is scheduled to be received during the current time slot. The MAC data transmission schedule and operation of switch 606 is under the control of a MAC processor 608 that receives and interprets MAC message data. In the typical system that combines both a transmitter and a receiver, MAC processor 608 may be the same entity as MAC processor 402 in FIG. 4 or MAC processor 302 and thus also generate MAC messages for transmission.

A soft decision value estimator 610 estimates likelihood values for transmitted symbols and provides the values to a trellis decoder 612. Soft decision value estimator 610 bases its estimates on knowledge of the symbol alphabet for MAC data which may be less tightly packed than the symbol alphabet used for non-MAC data. Trellis decoder 612 then outputs an estimate of the data input to the MAC data convolutional coder on the transmit end. Trellis decoder 612 decodes according to the convolutional code employed at the transmit end for MAC data. A Reed-Solomon decoder 614 decodes according to the Reed-Solomon code applied to the MAC data at the transmit end to recover the MAC message data to pass along to MAC processor 608.

Similarly for the non-MAC data a soft decision value estimator 616 estimates likelihood values for transmitted symbols and provides the values to a trellis decoder 618. Trellis decoder 618 then estimates the data input to the non-MAC data convolutional coder on the transmit end in accordance with the transmission convolutional code. A Reed-Solomon decoder 620 then decodes according to the Reed-Solomon code applied to the non-MAC data at the transmit end. According to the present invention, the decoding elements of receiver system 600 may operate differently for MAC data and for non-MAC data to match differences in the coding schemes applied at the transmit end.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, MAC data may include power control information and other information relating to coordinating access to a common transmission medium in addition to scheduling messages and access requests. Also, interleaving techniques and parameters may also be varied for MAC data and non-MAC data. Also, although the present invention has been discussed in reference to wireless systems, embodiments of the present invention may also operate in a wired communication system such as a data over cable network. All publications, patents, and patent applications cited herein are hereby incorporated by reference.

What is claimed:

1. In a digital communication system employing a transmission medium shared among multiple users, a transmitter system comprising:

a first encoder that encodes data related to coordinating access to said transmission medium according to a first encoding scheme;

a second encoder that encodes data not related to coordinating access to said transmission medium according to a second encoding scheme; and a control system that allocates transmission time between output of said first encoder and said second encoder; and wherein said first encoding scheme introduces more redundancy than said second encoding scheme.

2. The transmitter system of claim 1 wherein said first encoding scheme and said second encoding scheme comprise convolutional encoding schemes and said first encoding scheme has a lower rate than said second encoding scheme.

3. The transmitter system of claim 1 wherein said first encoding scheme and said second encoding scheme comprise trellis encoding schemes and first encoding scheme has a lower rate than said second encoding scheme.

4. The transmitter system of claim 1 wherein said first encoding scheme and said second encoding scheme comprise block encoding schemes.

5. The transmitter system of claim 4 wherein said block encoding schemes comprise Reed-Solomon encoding schemes.

6. In a digital communication system employing a transmission medium shared among multiple users, a transmitter system comprising:

a first mapper that outputs complex symbol values falling on a first symbol constellation responsive to data relating to coordinating access to said transmission medium;

a second mapper that outputs complex symbol values falling on a second symbol constellation responsive to data not relating to coordinating access to said transmission medium; and a control system that allocates transmission time between output of said first mapper and output of said second mapper; and wherein complex symbol values of said first symbol constellation are spaced more widely than complex symbol values of said second symbol constellation.

7. In a digital communication system employing a transmission medium shared among multiple users, a receiver system comprising:

a first decoder that decodes data related to coordinating access to said transmission medium according to a first encoding scheme;

a second decoder that decodes data not related to coordinating access to said transmission medium according to a second encoding scheme; and a control system that selects output of either said first decoder or said second decoder for reception; and wherein said first encoding scheme introduces more redundancy than said second encoding scheme.

8. The receiver system of claim 7 wherein said first encoding scheme and said second encoding scheme comprise convolutional encoding schemes and said first encoding scheme has a lower rate than said second encoding scheme.

9. The receiver system of claim 7 wherein said first encoding scheme and said second encoding scheme comprise trellis encoding schemes and said first encoding scheme has a lower rate than said second encoding scheme.

10. The receiver system of claim 7 wherein said first encoding scheme and said second encoding scheme comprise block encoding schemes.

11. The receiver system of claim 7 wherein said block encoding schemes comprise Reed-Solomon encoding schemes.

12. In a digital communication system employing a transmission medium shared among multiple users, a method for transmitting comprising:

encoding data related to coordinating access to said transmission medium according to a first encoding scheme;

encoding data not related to coordinating access to said transmission medium according to a second encoding scheme; and transmitting responsive to output by either said first encoder or said second encoder; and wherein said first encoding scheme introduces more redundancy than said second encoding scheme.

13. The method of claim 12 wherein said first encoding scheme and said second encoding scheme comprise convolutional encoding schemes and said first encoding scheme has a lower rate than said second encoding scheme.

14. The method of claim 12 wherein said first encoding scheme and said second encoding scheme comprise trellis encoding schemes and said first encoding scheme has a lower rate than said second encoding scheme.

15. The method of claim 12 wherein said first encoding scheme and said second encoding scheme comprise block encoding schemes.

16. The method of claim 15 wherein said block encoding schemes comprise Reed-Solomon encoding schemes.

17. In a digital communication system employing a common transmission medium, a method for controlling transmission comprising:

transforming data into a modulation signal, said data comprising data relating to controlling access to said common transmission medium and data not relating to controlling access to said common transmission medium; and converting said modulation signal to an RF signal for transmission; and wherein said transforming step applies greater protection against channel impairments to said data relating to controlling access to said common transmission medium.

18. In a digital communication system employing a transmission system employed by multiple users, a method for receiving comprising:

decoding data related to coordinating access to said transmission medium according to a first encoding scheme;

decoding data related to coordinating access according to a second encoding scheme; and selecting for reception between data decoded according to said first encoding scheme and data decoded according to said second encoding scheme; and wherein said first encoding scheme introduces more redundancy than said second encoding scheme.

19. The method of claim 18 wherein said first encoding scheme and said second encoding scheme comprise convolutional encoding schemes and said first encoding scheme has a lower rate than said second encoding scheme.

20. The method of claim 18 wherein said first encoding scheme and said second encoding scheme comprise trellis encoding schemes and said first encoding scheme has a lower rate than said second encoding scheme.

21. The method of claim 18 wherein said first encoding scheme and said second encoding scheme comprise block encoding schemes.

22. The method of claim 18 wherein said block encoding schemes comprise Reed-Solomon encoding schemes.

23. In a digital communication system employing a transmission medium shared among multiple users, apparatus for transmitting comprising:

first means for encoding data related to coordinating access to said transmission medium according to a first encoding scheme;

second means for encoding data not related to coordinating access to said transmission medium according to a second encoding scheme; and means for transmitting responsive to output by either said first encoding means or said second encoding means; and wherein said first encoding scheme introduces more redundancy than said second encoding scheme.

24. In a digital communication system employing a common transmission medium, apparatus for controlling transmission, said apparatus comprising:

means for transforming data into a modulation signal, said data comprising data relating to controlling access to said common transmission medium and data not relating to controlling access to said common transmission medium; and means for converting said modulation signal to an RF signal for transmission; and wherein said transforming means applies greater protection against channel impairments to said data relating to controlling access to said common transmission medium.

25. In a digital communication system employing a transmission system employed by multiple users, apparatus for receiving, said apparatus comprising:

means for decoding data related to coordinating access to said transmission medium according to a first encoding scheme;

means for decoding data related to coordinating access according to a second encoding scheme; and means for selecting for reception between data decoded according to said first encoding scheme and data decoded according to said second encoding scheme; and wherein said first encoding scheme introduces more redundancy than said second encoding scheme.

* * * * *

(12) EX PARTE REEXAMINATION CERTIFICATE (7173rd)
United States Patent
Jones et al.

(10) Number: US 6,621,872 C1
(45) Certificate Issued: Nov. 17, 2009

(54) SYSTEMS AND METHODS FOR IMPROVED MEDIUM ACCESS CONTROL MESSAGING

(75) Inventors: Vincent K. Jones, Redwood Shores, CA (US); Michael Pollack, Cupertino, CA (US); Gregory G. Raleigh, El Granada, CA (US)

(73) Assignee: Cisco Technology, Inc., San Jose, CA (US)

Reexamination Request:
No. 90/010,086, Jan. 8, 2008

Reexamination Certificate for:
Patent No.: 6,621,872
Issued: Sep. 16, 2003
Appl. No.: 09/282,516
Filed: Mar. 31, 1999

(51) Int. Cl.
*H04L 1/00* (2006.01)

(52) U.S. Cl. .......................... 375/265; 375/341
(58) Field of Classification Search ............... 365/265; 380/26, 46
See application file for complete search history.

(56) References Cited

U.S. PATENT DOCUMENTS

| | | | | |
|---|---|---|---|---|
| 5,148,485 A | * | 9/1992 | Dent | 380/46 |
| 5,517,530 A | * | 5/1996 | Gardner | 375/325 |
| 5,521,559 A | * | 5/1996 | Ichihara | 332/117 |
| 5,537,443 A | * | 7/1996 | Yoshino et al. | 375/340 |
| 5,648,985 A | * | 7/1997 | Bjerede et al. | 375/219 |
| 5,732,106 A | * | 3/1998 | Rasmussen et al. | 375/296 |
| 5,790,570 A | * | 8/1998 | Heegard et al. | 714/755 |
| 5,907,584 A | * | 5/1999 | Leveque | 375/296 |
| 5,909,460 A | * | 6/1999 | Dent | 375/130 |

OTHER PUBLICATIONS

EN 300 959: Digital cellular telecommunications system (Phase 2+); Modulation (GSM 05.04 version 6.0.1 Release 1997) ("GSM 05.04") European Telecommunications Standards Institute, Jul. 1998.*

TS 100 573: Digital cellular telecommunications system (Phase 2+); Physical layer on the radio path; General description (GSM 05.01 version 6.1.1 Release 1997) ("GSM 05.01") European Telecommunications Standards Institute, Mar. 1999.*

* cited by examiner

*Primary Examiner*—Alexander J Kosowski (57) ABSTRACT

Systems and methods for communicating medium access control (MAC) data without errors. Different encoding processes may be used to encode MAC data and data unrelated to MAC. The encoding processes used for MAC data employ more redundancy and are therefore capable of transmitting data without errors in more severe conditions than the encoding processes used for non-MAC data. Both MAC data and non-MAC data may be represented as a series of so-called symbols where each symbol is a complex value used to modulate a sinusoidal carrier signal. MAC data transmissions may employ a set of symbols having more widely spaced complex values than the symbol set used for non-MAC data transmissions. While the receiver is receiving MAC data, it may more easily distinguish which symbols have been sent, even when the symbols have been heavily corrupted with noise and interference. Thus network operation may be properly coordinated even in the presence of severe degradation of data transmission quality.

US 6,621,872 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 10, 15, and 21 are cancelled.

Claims 1–3, 5, 7–9, 11–14, 16–20 and 22–25 are determined to be patentable as amended.

Claim 6 was not reexamined.

1. In a digital communication system employing a transmission medium shared among multiple users, a transmitter system comprising:
   a first *block* encoder [that encodes] *operable to encode* data related to coordinating access to said transmission medium according to a first *block* error-encoding scheme *to produce a first output;*
   *a first convolutional encoder operable to encode said first output according to a first convolutional error-encoding scheme to produce a second output;*
   *a first mapper operable to generate a first set of symbols based on said second output to produce a third output for transmission on at least a first orthogonal frequency-division multiplexing (OFDM) subchannel;*
   a second *block* encoder [that encodes] *operable to encode* data not related to coordinating access to said transmission medium according to a second *block* error-encoding scheme *to produce a fourth output;*
   *a second convolutional encoder operable to encode said fourth output according to a second convolutional error-encoding scheme to produce a fifth output;*
   *a second mapper operable to generate a second set of symbols based on said fifth output to produce a sixth output for transmission on at least a second OFDM subchannel;* and
   a control system [that allocates] *operable to allocate* transmission time between *said third* output [of said first encoder] and said [second encoder] *sixth output;* and wherein said first *block* error-encoding scheme introduces more redundancy than said second *block* error-encoding scheme *and said first convolutional error-encoding scheme introduces more redundancy than said second convolutional error-encoding scheme.*

2. The transmitter system of claim 1 wherein [said first encoding scheme and said second encoding scheme comprise convolutional encoding schemes and] said first *convolutional* error-encoding scheme has a lower rate than said second *convolutional* error-encoding scheme.

3. The transmitter system of claim 1 wherein said first *convolutional* error-encoding scheme and said second *convolutional* error-encoding scheme comprise trellis encoding schemes and first *convolutional* error-encoding scheme has a lower rate than said second *convolutional* error-encoding scheme.

5. The transmitter system of [claim 4] *claim 1* wherein said block *error*-encoding schemes comprise Reed-Solomon encoding schemes.

7. In a digital communication system employing a transmission medium shared among multiple users, a receiver system comprising:
   *a first value estimator operable to receive a first set of symbols on at least a first orthogonal frequency-division multiplexing (OFDM) subchannel and to produce a first output based on said first set of symbols;*
   *a first convolutional decoder operable to decode said first output according to a first convolutional error-encoding scheme to produce a second output;*
   a first *block* decoder [that decodes] *operable to decode* data related to coordinating access to said transmission medium according to a first *block* error-encoding scheme *to product third output;*
   *a second value estimator operable to receive a second set of symbols on at least a second OFDM subchannel and to produce a fourth output based on said second set of symbols;*
   *a second convolutional decoder operable to decode said fourth output according to a second convolutional error-encoding scheme to produce a fifth output;*
   a second *block* decoder [that decodes] *operable to decode* data not related to coordinating access to said transmission medium according to a second *block* error-encoding scheme *to produce a sixth output;* and
   a control system that selects *either said third output or said sixth* output [of either said first decoder or said second decoder] for reception; and wherein said first *block* error-encoding scheme introduces more redundancy than said second *block* error-encoding scheme *and said first convolutional error-encoding scheme introduces more redundancy than said second convolutional error-encoding scheme.*

8. The receiver system of claim 7 wherein [said first encoding scheme and said second encoding scheme comprise convolutional encoding schemes and] said first *convolutional* error-encoding scheme has a lower rate than said second *convolutional* error-encoding scheme.

9. The receiver system of claim 7 wherein said first *convolutional* error-encoding scheme and said second *convolutional* error-encoding scheme comprise trellis encoding schemes and said first *convolutional* error-encoding scheme has a lower rate than said second *convolutional* error-encoding scheme.

11. The receiver system of claim 7 wherein said block *error*-encoding schemes comprise Reed-Solomon encoding schemes.

12. In a digital communication system employing a transmission medium shared among multiple users, a method for transmitting comprising:
   encoding data related to coordinating access to said transmission medium according to a first *block* error-encoding scheme *to produce a first output;*
   *encoding said first output according to a first convolutional error-encoding scheme to produce a second output;*
   *mapping said second output to a first set of symbols to produce a third output for transmission on at least a first orthogonal frequency-division multiplexing (OFDM) subchannel;*
   encoding data not related to coordinating access to said transmission medium according to a second *block* error-encoding scheme *to produce a fourth output;* encoding said fourth output according to a second convolutional error-encoding scheme to produce a fifth output;

mapping said fifth output to a second set of symbols to produce a sixth output for transmission on at least a second OFDM subchannel; and transmitting responsive to[output by either said first encoder or said second encoder]; *either said third output or said sixth output,* and wherein said first *block error-*encoding scheme introduces more redundancy than said second *block error-encoding scheme and said first convolutional error-encoding scheme introduces more redundancy than said second convolutional error-encoding scheme.*

13. The method of claim 12 wherein [said first encoding scheme and said second encoding scheme comprise convolutional encoding schemes and] said first *convolutional error-*encoding scheme has a lower rate than said second *convolutional error-*encoding scheme.

14. The method of claim 12 wherein said first *convolutional error-*encoding scheme and said second *convolutional error-*encoding scheme comprise trellis encoding schemes and said first *convolutional error-*encoding scheme has a lower rate than said second *convolutional error-*encoding scheme.

16. The method of [claim 15] *claim 12* wherein said block *error-*encoding schemes comprise Reed-Solomon encoding schemes.

17. In a digital communication system employing a common transmission medium, a method for controlling transmission comprising:

transforming data into a [modulation signal] *first set of outputs according to a plurality of block error-encoding schemes*; said data comprising data relating to controlling access to said common transmission medium and data not relating to controlling access to said common transmission medium;

*transforming said first set of outputs into a second set of outputs according to a plurality of convolutional error-encoding schemes;* mapping each of *said second set of* outputs to a plurality of symbols to produce a set of modulation signals; and converting said *set of* modulation [signal to an RF signal] *signals to a set of RF signals each* for transmission *on at least one orthogonal frequency-division multiplexing (OFDM) subchannel;* and wherein [said transforming step] *transforming said data into said first set of outputs* applies greater protection against channel impairments to said data relating to controlling access to said common transmission medium *and transforming said first set of outputs into said second set of outputs applies greater protection against channel impairments to said first set of outputs relating to controlling access to said common transmission medium.*

18. In a digital communication system employing a transmission system employed by multiple users, a method for receiving comprising:

receiving a first set of symbols on at least a first orthogonal frequency-division multiplexing (OFDM) subchannel and producing a first output based on said first set of symbols;

decoding said first output according to a first convolutional error-encoding scheme to produce a second output;

decoding data *in said second output that is* related to coordinating access to said transmission medium according to a first *block error-*encoding scheme *to produce a third output;* receiving a second set of symbols on at least a second OFDM subchannel and producing a fourth output based on said second set of symbols;

decoding said fourth output according to a second convolutional error-encoding scheme to produce a fifth output;

decoding data *in said fifth output that is not* related to coordinating access according to a second *block error-*encoding scheme *to produce a sixth output;* and selecting for reception between [data decoded according to said first encoding scheme and data decoded according to said second encoding scheme] *said third output and said sixth output*; and wherein said first *block error-*encoding scheme introduces more redundancy than said second *block error-*encoding scheme *and wherein said first convolutional error-encoding scheme introduces more redundancy than said second convolutional error-encoding scheme.*

19. The method of claim 18 wherein [said first encoding scheme and said second encoding scheme comprise convolutional encoding schemes and] said first *convolutional error-*encoding scheme has a lower rate than said second *convolutional error-*encoding scheme.

20. The method of claim 18 wherein said first *convolutional error-*encoding scheme and said second *convolutional error-*encoding scheme comprise trellis encoding schemes and said first *convolutional error-*encoding scheme has a lower rate than said second *convolutional error-*encoding scheme.

22. The method of claim 18 wherein said block *error-*encoding schemes comprise Reed-Solomon encoding schemes.

23. In a digital communication system employing a transmission medium shared among multiple users, apparatus for transmitting comprising:

[first] means for encoding data related to coordinating access to said transmission medium according to a first *block error-*encoding scheme *to produce a first output;*

*means for encoding said first output according to a first convolutional error-encoding scheme to produce a second output;*

*means for mapping said second output to a first set of symbols to produce a third output for transmission on at least a first orthogonal frequency-division multiplexing (OFDM) subchannel;*

[second] means for encoding data not related to coordinating access to said transmission medium according to a second *block error-*encoding scheme *to produce a fourth output;*

*means for encoding said fourth output according to a second convolutional error-encoding scheme to produce a fifth output;*

*means for mapping said fifth output to a second set of symbols to produce a sixth output for transmission on at least a second OFDM subchannel;* and means for transmitting responsive to [output by either said first encoding means or said second encoding means] *said third output or said sixth output,*; and wherein said first *block error-*encoding scheme introduces more redundancy than said second *block error-*encoding scheme *and wherein said first convolutional error-encoding scheme introduces more redundancy than said second convolutional error-encoding scheme.*

24. In a digital communication system employing a common transmission medium, apparatus for controlling transmission, said apparatus comprising:

means for transforming data into a [modulation signal] *first set of outputs according to a plurality of block error-encoding schemes*, said data comprising data relating to controlling access to said common transmission medium and data not relating to controlling access to said common transmission medium;

*means for transforming said first set of outputs into a second set of outputs according to a plurality of convolutional error-encoding schemes;*

*means for mapping each of said second set of outputs to a plurality of symbols to produce a set of modulation signals;* and means for converting said *set of* modulation [signal to an RF signal] *signals to a set of RF signals each* for transmission *on at least one orthogonal frequency-division multiplexing (OFDM) subchannel*; and wherein said [transforming] means *for transforming data* applies greater protection against channel impairments to said data relating to controlling access to said common transmission medium *and wherein said means for transforming said first set of outputs applies greater protection against channel impairments to said first set of outputs relating to controlling access to said common transmission medium*.

25. In a digital communication system employing a transmission system employed by multiple users, apparatus for receiving, said apparatus comprising:

*means for receiving a first set of symbols on at least a first orthogonal frequency-division multiplexing (OFDM) subchannel and producing a first output based on said first set of symbols;*

*means for decoding said first output according to a first convolutional error-encoding scheme to produce a second output;* means for decoding data *in said second output that is* related to coordinating access to said transmission medium according to a first *block error*-encoding scheme *to produce a third output;*

*means for receiving a second set of symbols on at least a second OFDM subchannel and producing a fourth output based on said second set of symbols;*

*means for decoding said fourth output according to a second convolutional error-encoding scheme to produce a fifth output;* means for decoding data *in said fifth output that is not* related to coordinating access according to a second *block error*-encoding scheme *to produce a sixth output;* and means for selecting for reception between [data decoded according to said first encoding scheme and data decoded according to said second encoding scheme] *said third output and said sixth output;* and wherein said first *block error*-encoding scheme introduces more redundancy than said second *block error*-encoding scheme *and wherein said first convolutional error-encoding scheme introduces more redundancy than said second convolutional error-encoding scheme.*

* * * * *